United States Patent
Hwang et al.

(10) Patent No.: US 10,477,534 B2
(45) Date of Patent: Nov. 12, 2019

(54) CONTROL CHANNEL RECEPTION METHOD AND USER EQUIPMENT FOR PERFORMING SAME

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/757,957

(22) PCT Filed: Oct. 5, 2016

(86) PCT No.: PCT/KR2016/011110
§ 371 (c)(1),
(2) Date: Mar. 6, 2018

(87) PCT Pub. No.: WO2017/061754
PCT Pub. Date: Apr. 13, 2017

(65) Prior Publication Data
US 2018/0249449 A1 Aug. 30, 2018

Related U.S. Application Data

(60) Provisional application No. 62/236,989, filed on Oct. 5, 2015.

(51) Int. Cl.
*H04W 72/04* (2009.01)
*H04L 25/03* (2006.01)
(Continued)

(52) U.S. Cl.
CPC ......... *H04W 72/042* (2013.01); *H04J 11/005* (2013.01); *H04L 25/03* (2013.01);
(Continued)

(58) Field of Classification Search
CPC .. H04W 72/042; H04W 72/082; H04L 5/0053
See application file for complete search history.

(56) References Cited

U.S. PATENT DOCUMENTS

2013/0272261 A1 10/2013 Seo et al.
2014/0044088 A1* 2/2014 Nogami ............... H04J 11/0069
370/329
(Continued)

OTHER PUBLICATIONS

PCT International Application No. PCT/KR2016/011110, International Search Report dated Jan. 5, 2017, 4 pages.
(Continued)

*Primary Examiner* — Shukri Taha
(74) *Attorney, Agent, or Firm* — Lee Hong Degerman Kang Waimey

(57) ABSTRACT

A disclosure of the present specification provides a method for receiving, from a serving cell, a downlink control channel subject to interference from a neighboring cell. The method comprises the steps of: receiving information on discontinuous reception (DRX), wherein the information on discontinuous reception includes information on a period comprising an interval in which the downlink control channel is monitored and an interval in which the downlink control channel is not monitored; and monitoring the downlink control channel received from the serving cell in the interval in which the downlink control channel is monitored. Here, the downlink control channel may be monitored in a state where the interference from the neighboring cell has not been alleviated.

10 Claims, 16 Drawing Sheets

(51) Int. Cl.
  *H04L 27/26* (2006.01)
  *H04W 72/08* (2009.01)
  *H04J 11/00* (2006.01)
  H04W 76/28 (2018.01)
  H04L 5/00 (2006.01)
(52) U.S. Cl.
  CPC ......... *H04L 27/26* (2013.01); *H04W 72/0486* (2013.01); *H04W 72/082* (2013.01); *H04L 5/0023* (2013.01); *H04W 76/28* (2018.02)

(56) References Cited

U.S. PATENT DOCUMENTS

2014/0206341 A1* 7/2014 Siomina ............ H04W 36/0085
  455/422.1
2015/0181571 A1 6/2015 Park et al.
2018/0027424 A1* 1/2018 Chen ................... H04W 76/28
  455/450

OTHER PUBLICATIONS

Morozov, G. et al., "Blind Maximum Likelihood Interference Mitigation for PDCCH of 3GPP LTE/LTE-A," Vehicular Technology Conference (VTC Spring), IEEE, May 2014, pp. 1-5, 7 pages.
Hwang, J. et al., "Advanced Receiver for Interference Cancellation in 3GPP LTE-A," The Journal of Korea Information and Communications Society, vol. 39A No. 07, Jul. 2014, pp. 389-397, 11 pages.

* cited by examiner

CONTROL CHANNEL RECEPTION METHOD AND USER EQUIPMENT FOR PERFORMING SAME

CROSS-REFERENCE TO RELATED APPLICATIONS

This application is the National Stage filing under 35 U.S.C. 371 of International Application No. PCT/KR2016/011110, filed on Oct. 5, 2016, which claims the benefit of U.S. Provisional Application No. 62/236,989, filed on Oct. 5, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. Such LTE is divided into a frequency division duplex (FDD) scheme and a time division duplex (TDD) scheme.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in order to satisfy the requirements of massively increasing wireless data traffic, a method of positioning small cells each having a coverage radius that is relatively smaller than a macro cell within a coverage of the macro cell is being considered.

As the number of cells increases, the problem of inter-cell interference becomes a more challenging issue.

SUMMARY OF THE INVENTION

An object of a disclosure of this specification is to provide a method of receiving a downlink control channel that is being interfered by an adjacent (or neighboring) cell.

An object of another disclosure of this specification is to provide a user equipment performing a method of receiving a downlink control channel that is being interfered by an adjacent (or neighboring) cell.

In order to achieve the above-described technical object, a disclosure of this specification provides a method for receiving a downlink control channel being interfered by an adjacent cell from a serving cell is disclosed. The method may include receiving information related to discontinuous reception (DRX). The information related to DRX includes information on a cycle period including a section during which a downlink control channel may be monitored and a section during which the downlink control channel is not monitored. If the received information corresponds to the monitored section, the method may include monitoring the downlink control channel being received from the serving cell. Herein, the downlink control channel may be monitored if the interference caused by the adjacent cell is not mitigated. More specifically, the downlink control channel may be monitored through a Maximal Ratio Combination (MRC) receiver.

The monitoring of the downlink control channel may include: if the discontinuous reception (DRX) is not set up, mitigating the interference caused in the downlink control channel by the adjacent cell and monitoring the downlink control channel having its interference mitigated.

In this case, the downlink control channel may have the interference mitigated by increasing a Signal-to-Interference-plus-Noise Ratio (SINR) through a plurality of antennas based on a Minimum Mean Square Error (MMSE). Furthermore, the downlink control channel may have the interference mitigated by further using a channel estimation result corresponding to the adjacent cell.

If a Control Format Indicator (CFI) of the serving cell is larger than a CFI of the adjacent cell, the downlink control channel may have the interference caused by a downlink data channel of the adjacent cell mitigated based on information related to a transmission mode, a precoding matrix, and an allocated power of the downlink control channel.

Also, if a load corresponding to a control channel of the adjacent cell is larger than a predetermined threshold value, the downlink control channel may have the interference mitigated through an Enhanced-Linear Minimum Mean Square Error-Interference Rejection Combining (E-LMMSE-IRC) receiver. If the load is smaller than the threshold value, the downlink control channel may have the interference mitigated through a Minimum Mean Square Error-Interference Rejection Combining (MMSE-IRC) receiver.

In order to achieve the above-described technical object, another disclosure of this specification provides a user equipment (UE) for receiving a downlink control channel being interfered by an adjacent cell from a serving cell. The user equipment may include a radio frequency (RF) unit for transmitting and receiving radio signals, and a processor controlling the RF unit. The processor may be configured to control the RF unit to receive information related to discontinuous reception (DRX). The information related to DRX includes information on a cycle period including a section during which a downlink control channel is monitored and a section during which the downlink control channel is not monitored, and. If the received information corresponds to the monitored section, the processor may be configured to control the RF unit to monitor the downlink control channel being received from the serving cell. Herein, the downlink control channel may be monitored if the interference caused by the adjacent cell is not mitigated.

According to the disclosure of this specification, in receiving a downlink control channel, by cancelling the interference by using an effective interference cancellation receiver in accordance with environment of the user equipment or the network, unnecessary increase in complexity and power consumption may be prevented.

DESCRIPTION OF EXEMPLARY EMBODIMENTS

Figure 1:
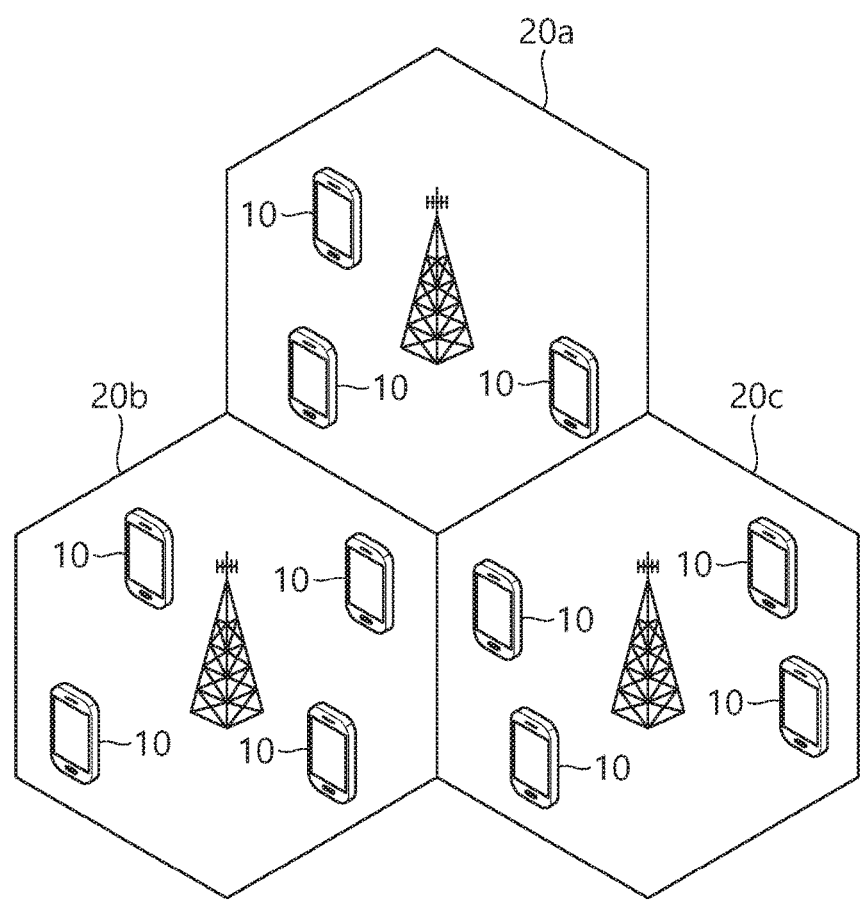
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as evolved-NodeB (eNB), base transceiver system (BTS), or access point.

As used herein, 'user equipment (UE)' may be stationary or mobile, and may be denoted by other terms such as device, wireless device, terminal, mobile station (MS), user terminal (UT), subscriber station (SS), mobile terminal (MT), and so on.

FIG. 1 illustrates an example of a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
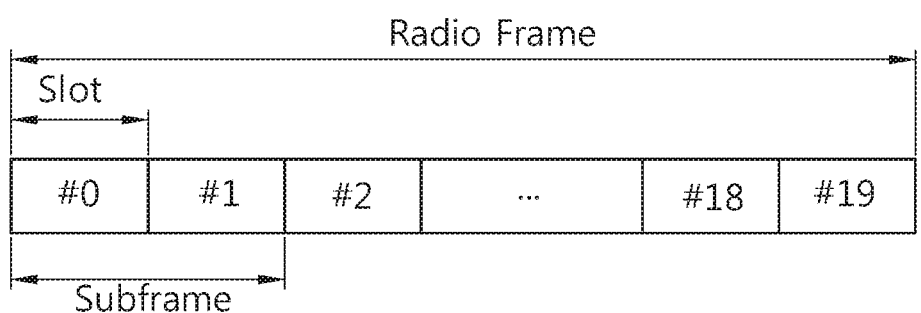
FIG. 2 illustrates the structure of a radio frame according to Frequency Division Duplex (FDD) in 3GPP LTE.

FIG. 2 illustrates the structure of a radio frame according to Frequency Division Duplex (FDD) in 3GPP LTE.

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted as transmission time interval (TTI). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP). Frequency Division Multiple Access (FDMA) symbols, symbol interval.

Figure 3:
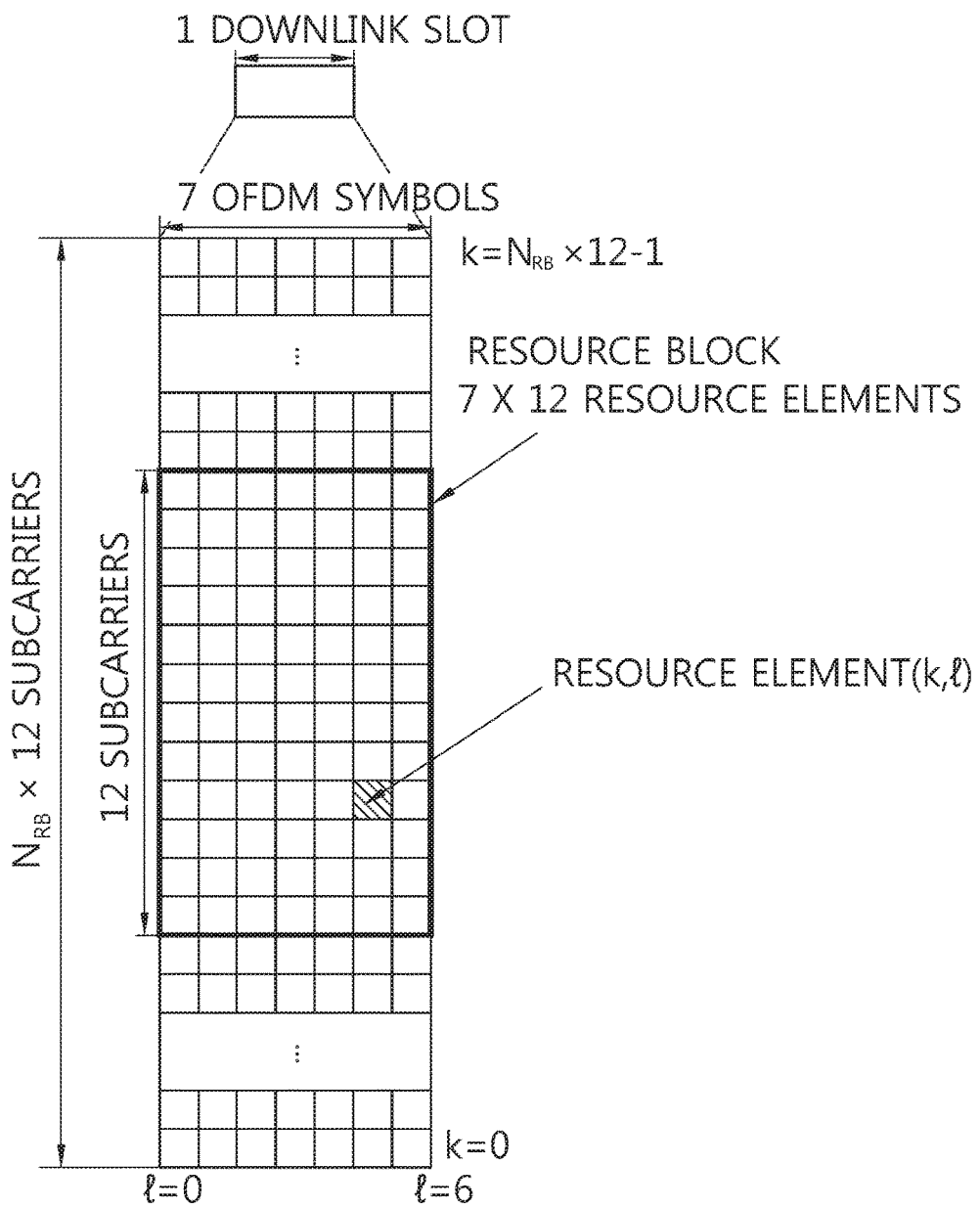
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of orthogonal frequency division multiplexing (OFDM) symbols in the time domain and NRB resource blocks (RBs) in the frequency domain. For example, in the LTE system, the number of resource blocks (RBs), i.e., NRB, may be one from 6 to 110. The RB may also be referred to as a Physical Resource Block (PRB).

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7x12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
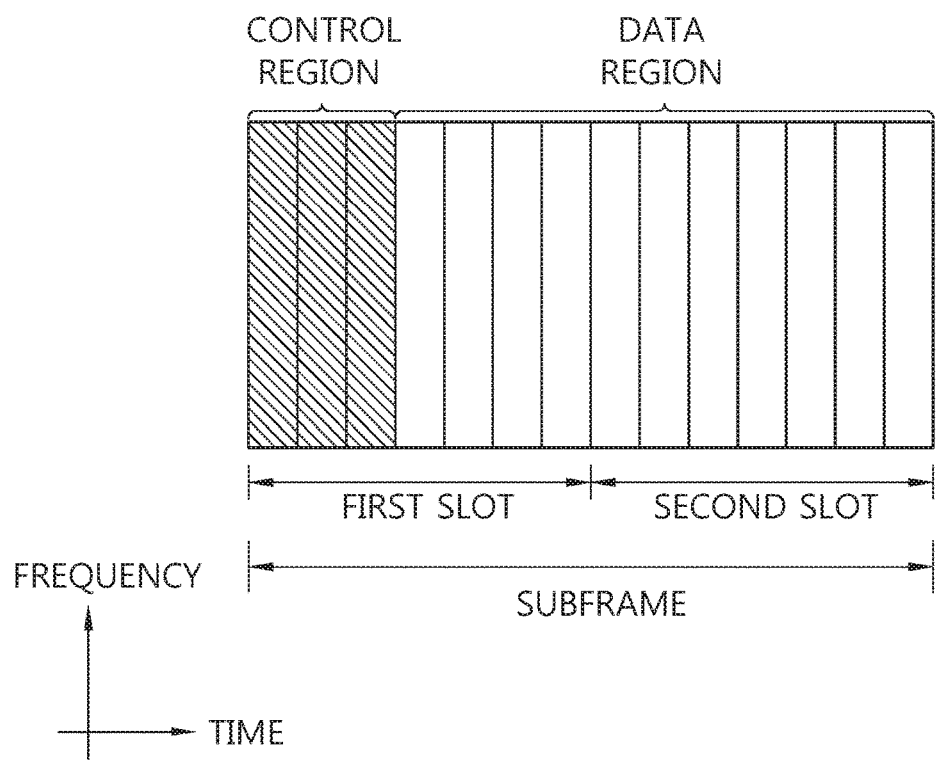
FIG. 4 illustrates the architecture of a downlink subframe.

FIG. 4 illustrates the architecture of a downlink sub-frame in 3GPP LTE.

In FIG. 4, assuming the normal CP, one slot includes seven OFDM symbols, by way of example.

The downlink (DL) sub-frame is split into a control region and a data region in the time domain. The control region includes up to first three OFDM symbols in the first slot of the sub-frame. However, the number of OFDM symbols included in the control region may be changed. A physical downlink control channel (PDCCH) and other control channels are assigned to the control region, and a PDSCH is assigned to the data region.

The physical channels in 3GPP LTE may be classified into data channels such as physical downlink shared channel (PDSCH) and physical uplink shared channel (PUSCH) and control channels such as physical downlink control channel (PDCCH), physical control format indicator channel (PCFICH), physical hybrid-ARQ indicator channel (PHICH), and physical uplink control channel (PUCCH).

The PCFICH transmitted in the first OFDM symbol of the sub-frame carries control format indicator (CIF) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries a positive-acknowledgement (ACK)/negative-acknowledgement (NACK) signal for an uplink (UL) hybrid automatic repeat request (HARQ). The ACK/NACK signal for uplink (UL) data on the PUSCH transmitted by the wireless device is sent on the PHICH.

The physical broadcast channel (PBCH) is transmitted in the first four OFDM symbols in the second slot of the first sub-frame of the radio frame. The PBCH carries system information necessary for the wireless device to communicate with the base station, and the system information transmitted through the PBCH is denoted as a master information block (MIB). In comparison, system information transmitted on the PDSCH indicated by the PDCCH is denoted as a system information block (SIB).

The PDCCH may carry activation of voice over internet protocol (VoIP) and a set of transmission power control commands for individual UEs in some UE group, resource allocation of an upper layer control message such as a random access response transmitted on the PDSCH, system information on a downlink-shared channel (DL-SCH), paging information on PCH, resource allocation information of an uplink shared channel (UL-SCH), and resource allocation and transmission format of a downlink-shared channel (DL-SCH). A plurality of PDCCHs may be sent in the control region, and the terminal may monitor the plurality of PDCCHs. The PDCCH is transmitted on one control channel element (CCE) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as downlink (DL) grant), resource allocation of PUSCH (this is also referred to as uplink (UL) grant), a set of transmission power control commands for individual UEs in some UE group, and/or activation of Voice over Internet Protocol (VoIP).

The base station determines a PDCCH format according to the DCI to be sent to the terminal and adds a cyclic redundancy check (CRC) to control information. The CRC is masked with a unique identifier (radio network temporary identifier (RNTI)) depending on the owner or purpose of the PDCCH. In case the PDCCH is for a specific terminal, the terminal's unique identifier, such as cell-RNTI (C-RNTI), may be masked to the CRC. Or, if the PDCCH is for a paging message, a paging indicator, for example, paging-RNTI (P-RNTI) may be masked to the CRC. If the PDCCH is for a system information block (SIB), a system information identifier, system information-RNTI (SI-RNTI), may be masked to the CRC. In order to indicate a random access response that is a response to the terminal's transmission of a random access preamble, a random access-RNTI (RA-RNTI) may be masked to the CRC.

In 3GPP LTE, blind decoding is used for detecting a PDCCH. The blind decoding is a scheme of identifying whether a PDCCH is its own control channel by demasking a desired identifier to the cyclic redundancy check (CRC) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as a radio network temporary identifier (RNTI)) to the CRC depending on the owner or purpose of the PDCCH.

According to 3GPP TS 36.211 V10.4.0, the uplink channels include a PUSCH, a PUCCH, a Sounding Reference Signal (SRS), and a physical random access channel (PRACH).

Figure 5:
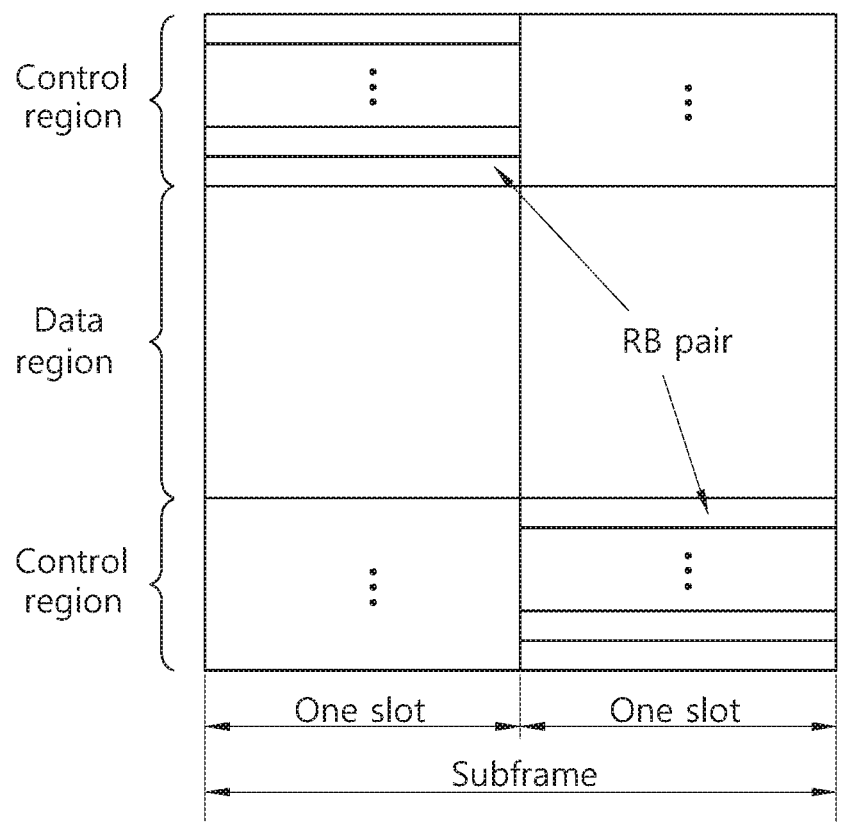
FIG. 5 illustrates the architecture of an uplink sub-frame in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a physical uplink control channel (PUCCH) for transmission of uplink control information. The data region is assigned a physical uplink shared channel (PUSCH) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an acknowledgement (ACK)/non-acknowledgement (NACK), a channel quality indicator (CQI) indicating a downlink channel state, and a scheduling request (SR) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a precoding matrix indicator (PMI), an HARQ, and a rank indicator (RI). Or, the uplink data may consist only of control information.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system can be divided into a contiguous carrier aggregation system in which the aggregated carriers are continuous and a non-contiguous carrier aggregation system in which the aggregated carriers are separated from each other. Hereinafter, when the carrier aggregation system is simply referred to as a carrier aggregation system, it should be understood that this includes both continuous and discontinuous element carriers. The number of element carriers to be aggregated between the downlink and the uplink may be set differently. The case where the number of downlink CCs and the number of uplink CCs are the same is referred to as symmetric aggregation, and the case where the number of downlink CCs is different is referred to as asymmetric aggregation.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

On the other hand, in order to transmit and receive packet data through a specific secondary cell in the carrier aggregation, the UE must first complete configuration for a specific secondary cell. Here, the configuration means that reception of system information necessary for data transmission/reception on a cell is complete. For example, the configuration may include an overall process of receiving common physical layer parameters or media access control (MAC) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

<Adoption of Small Cells>

In order to satisfy the requirements of massively increasing wireless data traffic, a method of positioning small cells each having a coverage radius that is relatively smaller than a macro cell within a coverage of the macro cell is being considered. Thus, as described above, a method of processing a larger amount of wireless data traffic through small cells is being considered. Since the conventional cell has a wider coverage than the small cells, the conventional cell is also referred to as a Macro cell. This will hereinafter be described in more detail with reference to FIG. 6.

Figure 6:
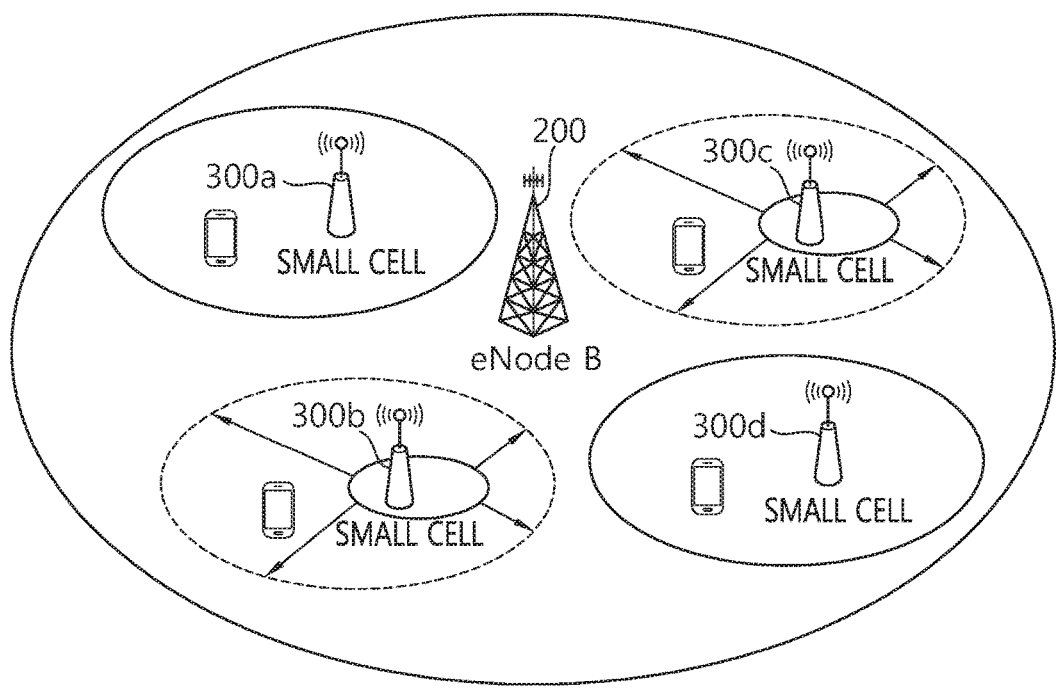
FIG. 6 illustrates an environment of a heterogeneous network having a macro cell and small cells co-exist therein.

FIG. 6 illustrates an environment of a heterogeneous network having a macro cell and small cells co-exist therein.

Referring to FIG. 6, a heterogeneous network environment, wherein a macro cell according to the conventional base station 200 overlaps with small cells according to one or more small base stations 300a, 300b, 300c, and 300d, is presented herein. Since the conventional base station provides a larger coverage than the small base station, the conventional base station is also referred to as macro base station (or Macro eNodeB (MeNB)). In this specification, the terms macro cell and macro base station will be alternately used. A UE that is connected to the macro cell 200 may be referred to as a Macro UE. The Macro UE receives a downlink signal from the macro base station and transmits an uplink signal to the macro base station.

In the above-described heterogeneous network, by setting the macro cell as a primary cell (Pcell), and by setting the small cell as a secondary cell (Scell), the gaps in the coverage area (hereinafter referred to as coverage gaps) may be filled. Furthermore, by setting the small cell as the primary cell (Pcell), and by setting the macro cell as the secondary cell (Scell), boosting of the overall performance may be achieved.

However, due to such adoption of small cells, inter-cell interference may be increased.

<Interference Cancellation>

Figure 7:
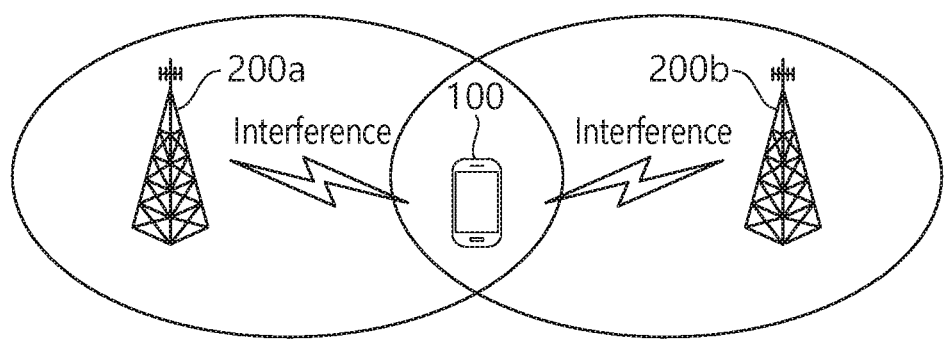
FIG. 7 is an exemplary diagram showing the problem of inter-cell interference.

FIG. 7 is an exemplary diagram showing the problem of inter-cell interference.

As shown in FIG. 7, in case a UE 100 is positioned in an overlaying area between a coverage of a first cell 200a and a coverage of a second cell 200b, a signal of the first cell 200a acts as an interference to a signal of the second cell 200b. And, conversely, a signal of the second cell 200b acts as an interference to a signal of the first cell 200a.

One of the most essential methods for resolving such interference problem is to use difference frequencies between the cells. However, since a frequency is a scarce (or rare) and expensive resource, the solution using frequency division was not a favorable solution to the service providers.

Accordingly, 3GPP sought to resolve the problem of inter-cell interference through time division.

In a sense that the time-division method, which was adopted in LTE Release-10, has evolved significantly as compared to the conventional frequency-division method, the time-division method is also referred to as an enhanced Inter-Cell Interference Coordination (eICIC). Herein, each cell that is causing the interference is defined as an Aggressor cell, and each cell that is being interfered is defined as a Victim cell. And, according to this method, in a specific subframe, the aggressor cell interrupts the data transmission, so as to allow the UE to maintain its connection to the victim cell in the corresponding subframe. In other words, in case heterogeneous cells co-exist, by having one cell temporarily interrupt signal transmission to a UE, which is undergoing a considerably high level of interference in a particular area (or region), almost no interference signal is transmitted.

Meanwhile, the specific subframe having its data transmission interrupted is referred to as an Almost Blank Subframe (ABS), and, apart from control information that is absolutely necessary, no data is transmitted from a subframe that corresponds to the ABS. Herein, for example, the control information that is absolutely necessary corresponds to CRS. Accordingly, data are not transmitted from a subframe being applied as an ABS, and only a CRS signal is transmitted from symbols number 0, number 4, number 7, and number 11.

Figure 8:
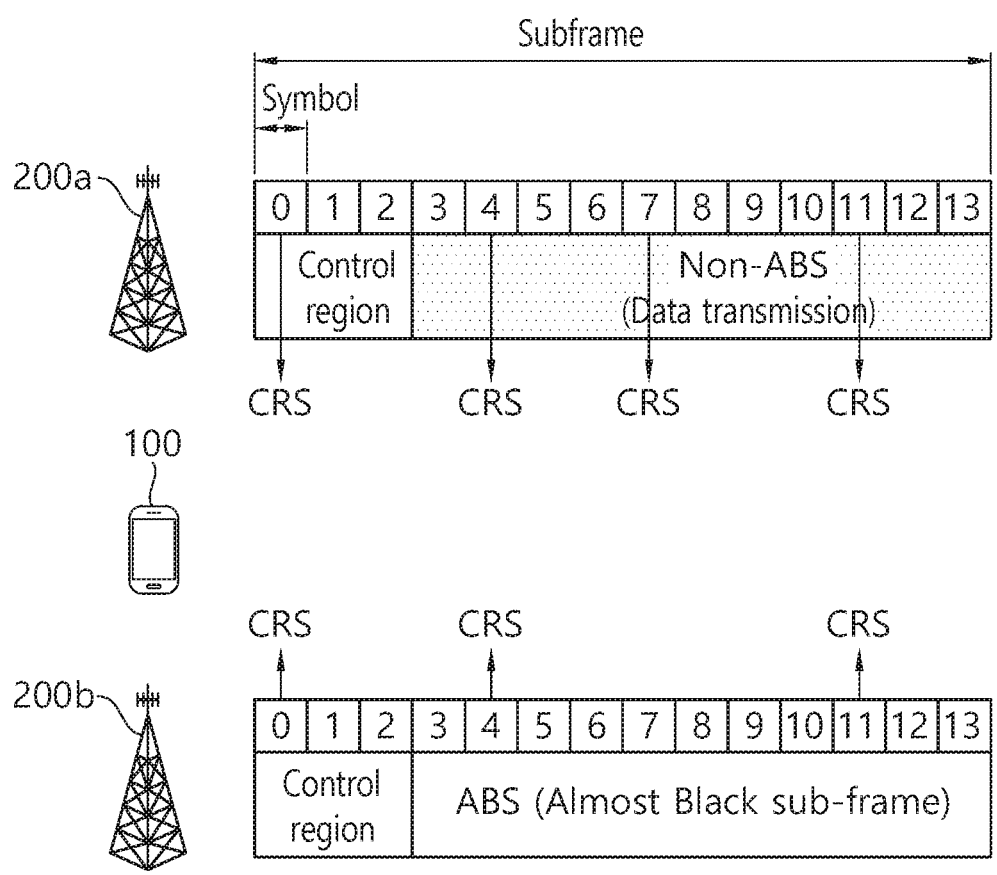
FIG. 8 is an exemplary diagram showing an enhanced Inter-Cell Interference Coordination (eICIC).

FIG. 8 is an exemplary diagram showing an enhanced Inter-Cell Interference Coordination (eICIC).

Referring to FIG. 8, the first cell 200a performs data transmission in a data region of a subframe shown in FIG. 8.

At this point, in order to resolve the problem of interference, the second cell 200b adopts eICIC. More specifically, when the eICIC is applied (or adopted), the corresponding frame is operated in accordance with an ABS, and no data may be transmitted from the data region.

However, in the subframe being operated in accordance with the ABS, only the CRS may be transmitted over symbol numbers 0, 4, 7, and 11.

Meanwhile, in order to cancel the interference more essentially, 3GPP has sought to define an interference cancellation receiver.

A total of 3 different types of interference cancellation receivers have been defined by 3GPP up to now. Firstly, there is a Type 3i Interference Rejection Combining (IRC), which may cancel inter-cell interference through a linear equalizer in a UMTS High Speed Downlink Packet Access (HSDPA). Secondly, there is an IRC receiver, which is configured by extending the technique of a Code Division Multiple Access (CDMA) dedicated interference control receiver of the UMTS and applying it to an OFDM-MIMO receiver in LTE. And, finally, therein a non-linear IC receiver, which cancels a synchronization signal, a broadcasting channel, and a reference signal of the interfering cell.

Following the above-described technical extension, the 3GPP has adopted a Network Assisted Interference Cancellation and Suppression (NAICS). Instead of resolving the problem of inter-cell interference by using the eICIC method, the NAICS may directly cancel the interference signal being transmitted from a neighboring cell based on the interference cancellation support information, which is received by the UE from the serving cell.

Figure 9A:
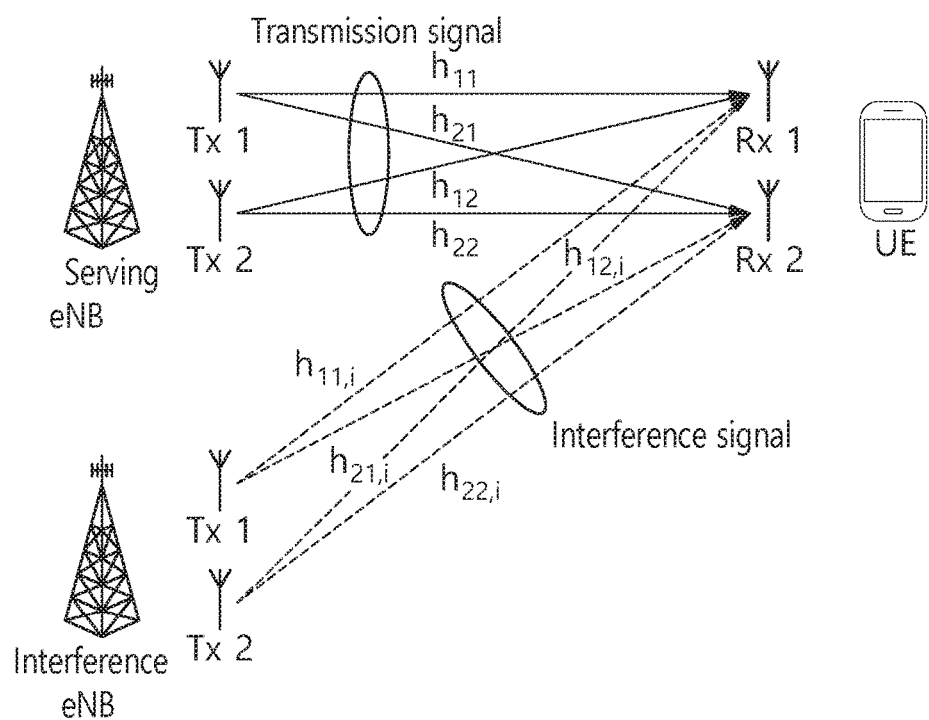
FIG. 9a is an exemplary diagram showing a situation where a signal from a serving base station is being interfered by an interference signal of an interfering base station.
Figure 9B:
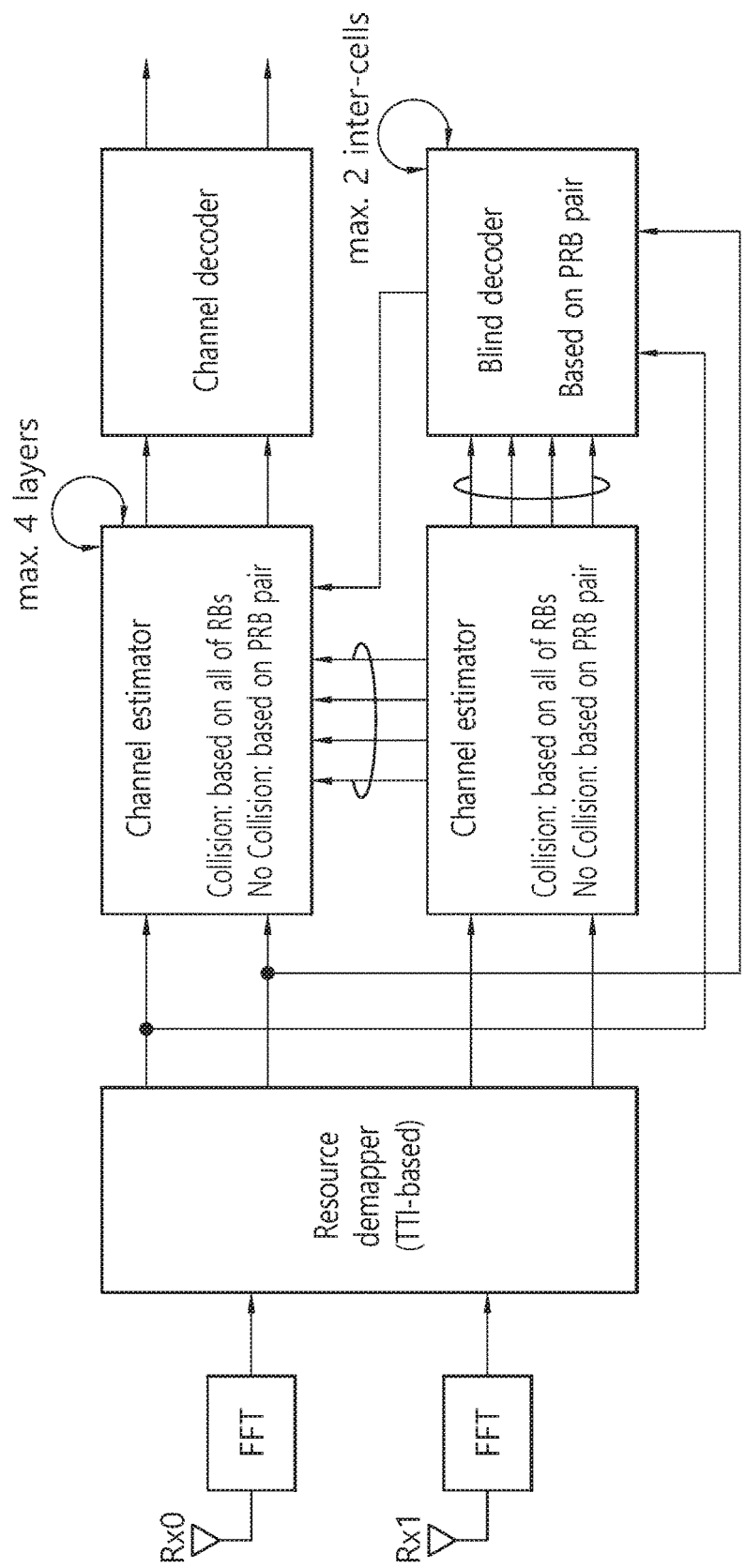
FIG. 9b illustrates a structure of a UE for performing interference cancellation reception.

FIG. 9a is an exemplary diagram showing a situation where a signal from a serving base station is being interfered by an interference signal of an interfering base station, and FIG. 9b illustrates a structure of a UE for performing interference cancellation reception.

Referring to FIG. 9a, the drawing shows an example where transmission signals being transmitted by the service base station through two transmitting antennas (Tx1, Tx2) are interfered by an interference signal being transmitted from a neighboring interfering base station. Herein, it will be assumed that the UE has 2 or 4 receiving antennas.

In the above-described environment, a mathematical modeling of the channel response resulting from the interference may be achieved as shown below.

$$y_{n,k} = \sum_{i=0}^{N_{cell}} H_{n,k}^i P_i x_{n,k}^i + z_{n,k} \quad \text{[Equation 1]}$$

$$\begin{bmatrix} y_{n,k,1} \\ \vdots \\ y_{n,k,b} \\ \vdots \\ y_{n,k,N_{rx}} \end{bmatrix} =$$

$$\sum_{i=0}^{N_{cell}} \begin{bmatrix} h_{n,k,1}^{i,1} & \cdots & h_{n,k,1}^{i,N_{tx}^i} \\ \vdots & \ddots & \vdots \\ h_{n,k,N_{rx}}^{i,1} & \cdots & h_{n,k,N_{rx}}^{i,N_{tx}^i} \end{bmatrix} \begin{bmatrix} p_{i,1} & \cdots & p_{i,N_{layer}^i} \end{bmatrix}$$

$$\begin{bmatrix} x_{n,k}^{i,1} \\ \vdots \\ x_{n,k}^{i,N_{layer}^i} \end{bmatrix} + \begin{bmatrix} z_{n,k,1} \\ \vdots \\ z_{n,k,b} \\ \vdots \\ z_{n,k,N_{rx}} \end{bmatrix} \in \mathbb{C}^{N_{rx}}$$

Herein, $y_{n,k,b}$ represents a signal being received in an $n^{th}$ OFDM symbol, km represents a $k^{th}$ RE in a $b^{th}$ antenna of the UE that is received from an $i^{th}$ base station. $x_{n,k}^{i,l}$ represents a signal being transmitted from a $k^{th}$ RE of the $i^{th}$ base station through an $l^{th}$ layer in the $n^{th}$ OFDM symbol. $z_{n,k,b}$ represents an adaptive white Gaussian noise in the $n^{th}$ OFDM symbol and the $k^{th}$ RE in a $b^{th}$ antenna of the UE. And, $h_{n,k,b}^{i,a}$ represents an impulse channel response transmitted from an $a^{th}$ antenna of the $i^{th}$ base station to the $n^{th}$ OFDM symbol and the $k^{th}$ RE in a $b^{th}$ antenna of the UE.

$P_i$ represents a precoding matrix of the $i^{th}$ base station. In case $N_{layer}^i=1$, the precoding matrix is expressed as Pi. $N_{rx}$ represents a number of receiving antennas. $N_{tx}^i$ represents a number of transmitting antennas of the $i^{th}$ base station. And, $N_{layer}^i$ represents a number of transmitting layers from the $i^{th}$ base station.

Referring to FIG. 9b, the interference cancellation receiver of the UE includes a FFT, a resource demapper, a channel estimator, a blind detector, a MIMO detector, and a channel decoder. The channel estimator estimates a channel based on the received signal. And, the MIMO detector performs MIMO detection the based on the output of the channel estimator and the blind detector. The channel decoder performs channel decoding by using a signal that is outputted from the MIMO detector.

Meanwhile, with the adoption of the small cells, the network density has increased, and, as a result, the interference between neighboring (or adjacent) cells has also increased. Furthermore, as the interference between neighboring (or adjacent) cells has increased, the overall performance of the UE has been degraded.

Accordingly, diverse research on interference cancellation receivers for cancelling interference on data channels caused by neighboring cells has been extensively carried out. However, in case the UE fails to properly receive the control channel due to the interference, which is caused by a neighboring cell, it will be difficult to expect a normal performance from the data channel as well. In other words, in case the interference caused by a neighboring cell is severe, the Signal-to-Interference-plus-Noise Ratio (SINR) decreases, thereby influencing the overall receiving performance. Therefore, an interference cancellation receiver is being required not only for the data channel but also for the control channel.

Disclosure of this Specification

The disclosures of this specification propose control methods of the interference cancellation receiver for cancelling interference in the control channel that is caused by a neighboring cell.

Before describing the environmental factors of the network or UE that are related to the operations of the interference cancellation receiver, the interference cancellation receiver for the control channel will first be described in detail.

1. Interference Control Receiver for the Control Channel

In order to cancel the interference caused in the control channel by a neighboring cell, the UE may use an MMSE-IRC receiver or an E-LMMSE-IRC receiver. Hereinafter, each type of interference control receiver will be described in detail.

(1) Minimum Mean Square Error-Interference Rejection Combining (MMSE-IRC)

By using the MMSE-IRC receiver, the UE may equally control the interference caused in the control channel just as the MMSE-IRC for the data channel.

The MMSE-IRC performs interference control by statistically maximizing the reception SINR, which results from reception beamforming, in light of a Minimum Mean Square Error (MMSE) by using two or more receiving antennas.

A mathematical model of the signal y(k,l), which is received by a $k^{th}$ subcarrier and an $l^{th}$ OFDM symbol in a multi-cell environment configured of $N_{cell}$ number of cells, may be represented as shown below.

$$y(k, l) = \sum_{i=0}^{N_{cell}-1} H_i(k, l) W_{Tx,i}(k, l) s_i(k, l) + n(k, l) \quad \text{[Equation 2]}$$

Herein, $H_i(k,l)$ represents a channel matrix between an $i^{th}$ cell and a receiving UE, and $W_{Tx,i}(k,l)$ represents a precoding matrix of the $i^{th}$ cell. $s_i(k,l)$ and $n(k,l)$ respectively represent a transmission signal of the $i^{th}$ cell and a Gaussian noise having dispersion. At this point, in case i is equal to 0, i.e., the $0^{th}$ cell will be assumed to be the serving cell.

When it is assumed that the receiver of an MMSE equalizer structure is used, $s_0(k,l)$ may be obtained by multiplying the received signal y by a coefficient matrix (or weight matrix) $W_{Rx,0}(k,l)$, which is configured of equalizer coefficients.

$$\hat{s}_{0(k,l)} = W_{Rx,0}(k,l) y(k,l) \quad \text{[Equation 3]}$$

In Equation 3, the equalizer coefficients may be expressed as shown below in Equation 4 according to the MMSE criterion.

$$W_{Rx,0}(k,l) = P_0 \tilde{G}_0^H(k,l) \overline{R}_{yy}^{-1} \quad \text{[Equation 4]}$$

Herein, $\tilde{G}_0(k,l) = \tilde{H}_0(k,l) W_{Tx,0}$ and, $\tilde{H}_0(k,l)$ represents the estimated channel matrix. $P_0$ represents a transmission power of the serving cell, and $\overline{R}_{yy}$ represents a covariance matrix of the reception signal. At this point, the covariance matrix of the reception signal is calculated as an average of the reception signal, as shown below in Equation 5.

$$\overline{R}_{yy} = E[y(k, l) y^H(k, l)] = P_0 \tilde{G}_0(k, l) \tilde{G}_0^H(k, l) + R_{I+N} \quad \text{[Equation 5]}$$

Herein, $R_{I-N}$ represents an error covariance matrix consisting of interference and noise, and $R_{I-N}$ is obtained by $E[\tilde{y}(k,l)\tilde{y}^H(k,l)]$. $\tilde{y}(k,l)$ represents an error signal excluding a serving cell signal, which is wanted by the reception signal, and may be expressed as shown below in Equation 6.

$$\tilde{y}(k,l) = y(k,l) - P_0 \tilde{G}_0^H(k,l) s(k,l) \quad \text{[Equation 6]}$$

Herein, s(k,l) may use a signal of a $k^{th}$ subcarrier and an $l^{th}$ reference signal, which are known by the UE.

(2) Enhanced-Linear Minimum Mean Square Error-Interference Rejection Combining (E-LMMSE-IRC)

In order to enhance the receiving performance of the control channel, the E-LMMSE-IRC receiver may be used.

By adding channel estimation information of the interfering cell to the covariance matrix estimation for the inaccurate interference and noise of the MMSE-IRC receiver, the E-LMMSE-IRC receiver may attempt to perform covariance matrix estimation with more enhanced accuracy.

In case of using the E-LMMSE-IRC, the covariance matrix $\overline{R}_{yy}$ of the reception signal may be expressed as shown below in Equation 7 by using a channel estimation value $\tilde{G}_1$ of the interfering cell.

$$\overline{R_{yy}} = P_0 \tilde{G}_0(k,l) \tilde{G}_0^H(k,l) + P_1 \tilde{G}_1(k,l) \tilde{G}_1^H(k,l) + R_{I+N} \quad \text{[Equation 7]}$$

Herein, the error covariance matrix $R_{I+N}$ for the interference and noise may be approximately obtained by using Equation 8 shown below.

$$R_{I+N} = E[\tilde{y}(k,l) \tilde{y}^H(k,l)] \quad \text{[Equation 8]}$$

More specifically, this method may enhance the overall receiving performance of the receiver, by having the E-LMMSE-IRC remove (or cancel) the interference of a cell causing the greatest interference in the serving cell from the reception signal.

Since the above-described E-LMMSE-IRC receiver estimates the channel of the interfering cell, the E-LMMSE-IRC receiver may also perform the CRS-Interference Cancellation (CRS-IC) operation.

2. Operations of the Interference Control Receiver According to the Environment of the Network or UE As described above, the UE may cancel the interference caused in the control channel by using any one of an MMSE-IRC receiver and an E-LMMSE-IRC receiver. Also, instead of using the MMSE-IRC receiver or the E-LMMSE-IRC receiver, the UE may also receive the control channel by using a Maximum Ratio Combining (MRC) receiver, which corresponds to a baseline receiver.

Meanwhile, in case the UE cancels the interference by using the E-LMMSE-IRC receiver, the receiving performance of the control channel may be more enhanced as compared to the case of using the MMSE-IRC receiver or the MRC receiver. However, due to the channel estimation of the interfering cell, complexity and power consumption in the E-LMMSE-IRC may be increased to a level higher than the MMSE-IRC receiver or the MRC receiver.

Therefore, in order to allow the UE to cancel (or remove) the interference caused in the control channel, it may be advantageous for the UE to use an adequate interference cancellation receiver according to the environment of the network or UE instead of always using the E-LMMSE-IRC receiver.

This specification proposes a solution for selecting an adequate interference cancellation receiver while considering the environment of the network or UE, in case the UE receives a control channel by using a specific interference cancellation receiver. Also, this specification proposes a solution allowing the UE to perform an effective channel estimation on an interfering cell by using the E-LMMSE-IRC receiver.

Listed below are environmental factors of the network or UE that should be taken into consideration when selecting or using an interference cancellation receiver.

CFI of an interference channel (or PDSCH starting symbol)
Loading of an interference control channel
Connected DRX mode
Enhanced PDCCH (ePDCCH)
Carrier Aggregation
Synchronous or asynchronous network Hereinafter, a solution for selecting or using the interference cancellation receiver according to each of the environmental factors will be described in detail.

(1) CFI of an Interference Channel (or PDSCH Starting Symbol)

Firstly, in order to allow the UE to acquire the CFI corresponding to the interfering cell, the network and the UE perform the following operations.

The network signals CFI information on an interfering cell to the UE. Then, the UE detects the CFI corresponding to the interfering cell. More specifically, the UE detects a PCFICH corresponding to the interfering cell. The UE receives the CFI being transmitted over the PCFICH. Then, the UE performs blind detection on a PDSCH starting symbol. Thereafter, the UE determines an interference cancellation receiver for cancelling interference caused in the control channel based on a comparison result between a CFI corresponding to the serving cell and a CFI corresponding to the interfering cell.

More specifically, if the CFI of the serving cell is identical to the CFI of the interfering cell, or if the CFI of the interfering cell is smaller than the CFI of the serving cell, the UE receives the control channel by using the E-LMMSE-IRC receiver without performing any additional operation.

Conversely, in case the CFI of the serving cell is larger than the CFI of the interfering cell, the UE and the network is required to perform additional operations in order to be able to use the E-LMMSE-IRC receiver.

Figure 10:
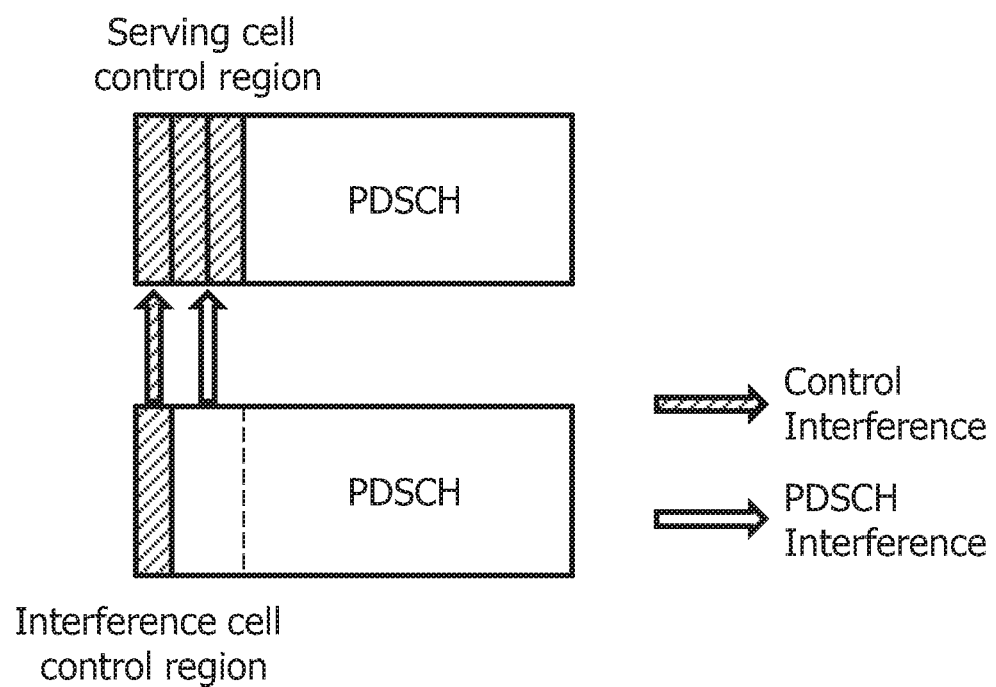
FIG. 10 is an exemplary drawing showing an area of a control channel, in a case where a CFI of a serving cell is greater than a CFI of an interfering cell.

FIG. 10 is an exemplary drawing showing an area of a control channel, in a case where a CFI of a serving cell is greater than a CFI of an interfering cell.

As shown in FIG. 10, in case the CFI of the serving cell (CFIs) is larger than the CFI of the interfering cell (CFI), the PDSCH of the interfering cell acts as an interference in the control channel region of the serving cell. In order to control the above-described interference, an effective (or valid) channel estimation value for the PDSCH of the interfering cell corresponding to the control channel region of the serving cell, which is to be applied to the E-LMMSE-IRC receiver, is required. More specifically, in order to use the E-LMMSE-IRC receiver, the UE and the network are required to perform the following operations for the symbol, wherein the PDSCH of the interfering cell acts as an interference, among the interference symbols of the serving cell.

In order to perform effective channel estimation for an interference symbol of the PDSCH, the UE performs blind detection on the information related to the transmission mode (TM), the precoding matrix (in case of a closed loop MIMO), and the allocated power of the interference channel.

In order to reduce the complexity in the blind detection performed by the UE, the network may limit the maximum value of the CFI to 4 or may limit the CFI value to the same CFI value of the serving cell via network coordination. In other words, the network may limit the scheduling of the PDSCH corresponding to the second ($2^{nd}$) or fourth ($4^{th}$) symbol or up to the symbol corresponding to the CFI value of the serving cell to Transmission Mode 2 (TM2), i.e., Space-Frequency Block Codes (SFBC).

(2) Loading of an Interference Control Channel

In case the loading corresponding to the control channel of the interfering cell is large, the accuracy in the noise covariance through the CRS-IC increases, thereby allowing the E-LMMSE-IRC receiver to achieve a more enhanced performance than the MMSE-IRC receiver. However, in case the loading corresponding to the control channel of the interfering cell is small, since the enhancement in the performance respective to the accuracy in the interference covariance is limited, the difference between the performance of the E-LMMSE-IRC receiver and the performance of the MMSE-IRC receiver is small.

Therefore, in case a load ($Load_{l\_control}$) corresponding to the control channel of the interfering cell is larger than a predetermined threshold value (Th_load), the control channel is received by using the E-LMMSE-IRC receiver. Conversely, in case a load ($Load_{l\_control}$) corresponding to the control channel of the interfering cell is smaller than the predetermined threshold value (Th_load), the control channel is received by using the MMSE-IRC receiver. Thus, the complexity in the UE may be reduced. In this case, the predetermined threshold value (Th_load) may be predetermined in advance or may be received from the network and may then be configured.

(3) Connected DRX Mode

In case a Discontinuous Reception (DRX) is set up in the UE, while the UE is in a RRC connected state, in order to reduce power consumption, the UE performs PDCCH monitoring only during a specific time period.

Figure 11:
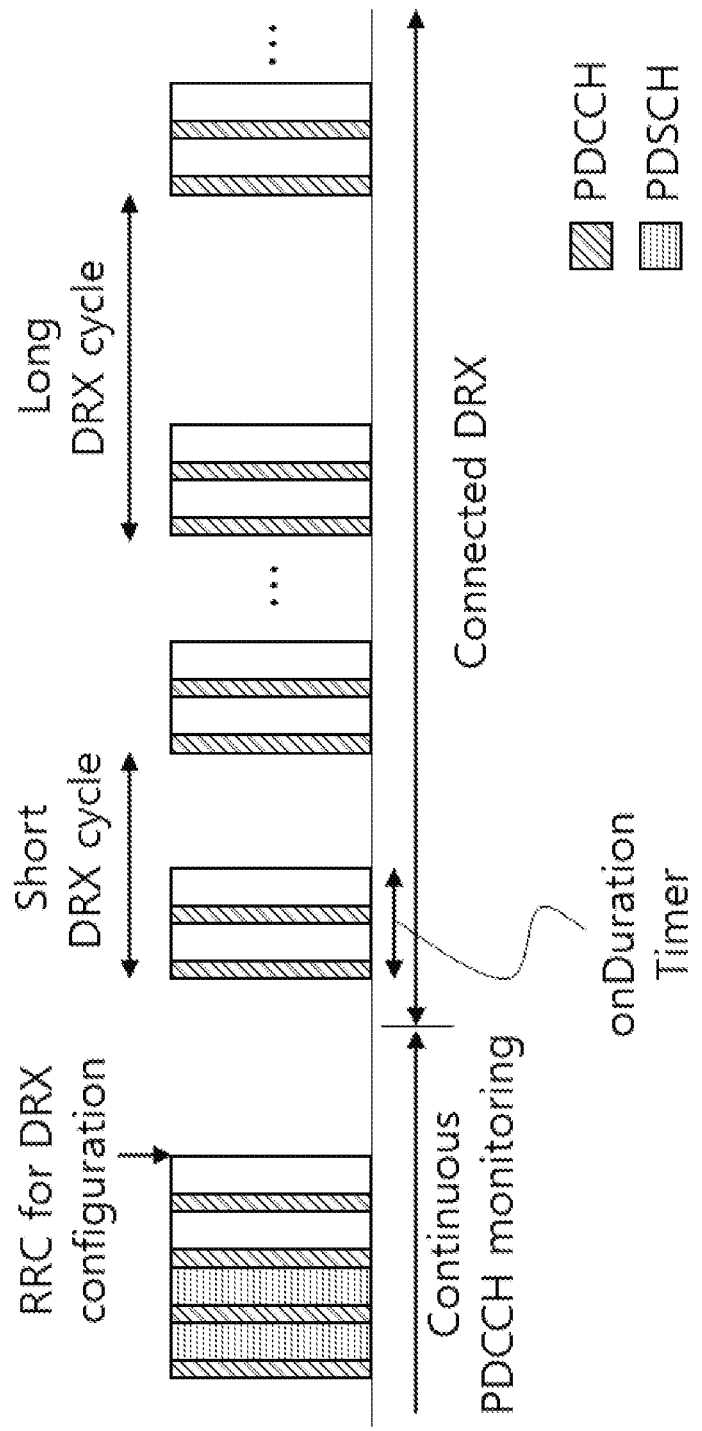
FIG. 11 is an exemplary drawing showing control channel monitoring operations of a UE configured to perform DRX.

FIG. 11 is an exemplary drawing showing control channel monitoring operations of a UE configured to perform DRX.

As shown in FIG. 11, the UE that is set to the connected DRX mode performs the operations for receiving the control channel during an onDuration section at a predetermined cycle period. If the control channel is received by using the E-LMMSE-IRC receiver, the UE is required to perform operations of channel estimation and CRS-IC of the interfering cell during the onDuration section. In this case, a problem may occur in that the power consumption is increased, as opposed to the preconfigured object of the DRX, which is to reduce the power consumption.

Therefore, during the onDuration section, the UE operating in the connected DRX mode may receive the control channel by using the MMSE-IRC receiver or the MRC receiver.

(4) Enhanced-PDCCH (ePDCCH)

In case the control channel that is to be received by the UE corresponds to an ePDCCH, and in case the UE receives the ePDCCH by using the E-LMMSE-IRC receiver, the UE or the network must acquire a channel estimation value of the interfering cell.

More specifically, the UE performs blind detection of information related to a transmission mode (TM), a precoding matrix, an allocated power, resource block (RB) allocation, and a DMRS port of the interfering cell corresponding to the ePDCCH region of the serving cell. In order to do so, the UE is required to perform a DMRS-IC operation.

In order to reduce complexity in the blind detection performed by the UE, the network may configure the ePDCCH regions of the serving cell and the interfering cell to be identical to one another, by using a localized ePDCCH via network coordination.

(5) Carrier Aggregation

In case a UE supporting carrier aggregation receives a control channel of a secondary cell (Scell) by using the E-LMMSE-IRC receiver, since the CFI and the actual the PDSCH starting symbol are different from one another, a process of acquiring the PDSCH starting symbol is required.

More specifically, the UE performs blind detection on the PDSCH starting symbol of the interfering secondary cell (Scell).

In order to reduce complexity in the blind detection on the secondary cell performed by the UE, the network may limit the maximum value of the CFI to 4 or may limit the CFI value to the same CFI value of the serving cell via network coordination. In other words, the network may limit the scheduling of the PDSCH corresponding to the second ($2^{nd}$) or fourth ($4^{th}$) symbol or up to the symbol corresponding to the CFI value of the serving cell to Transmission Mode 2 (TM2), i.e., SFBC.

(6) Synchronous or Asynchronous Network

In an asynchronous network, the performance of channel estimation and CRS-IC of the interfering cell requires a very high level of complexity. Therefore, in case the UE uses the E-LMMSE-IRC receiver in the asynchronous network, the complexity becomes higher than the interference cancelling performance that is acquired by the UE. Thus, the overall gain is lost. Therefore, in case the network corresponds to an asynchronous network, the UE may receive the control channel by using the MMSE-IRC receiver, and the UE may receive the control channel by using the E-LMMSE-IRC receiver, only in the case where the network corresponds to a synchronous network.

Figure 12:
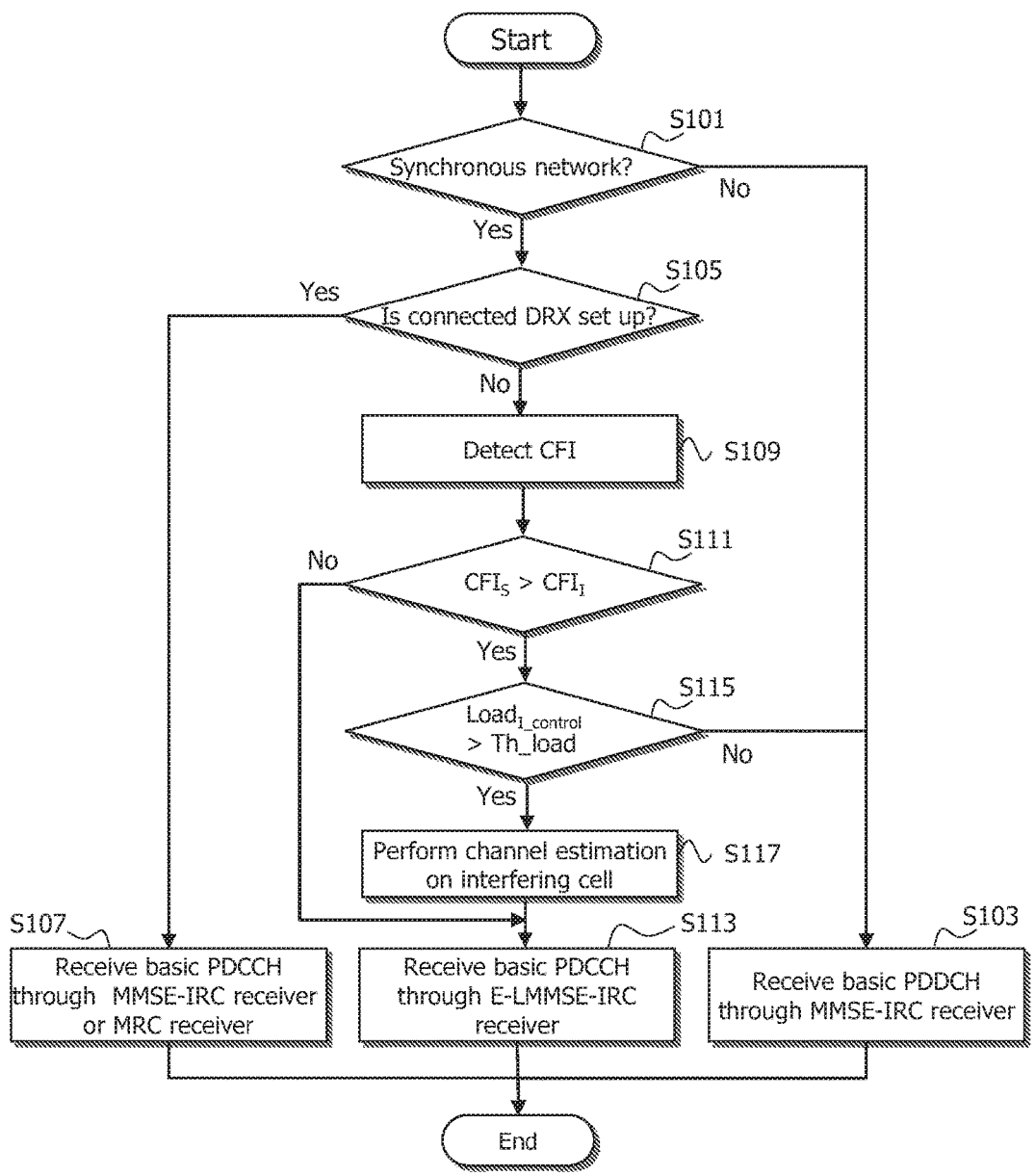
FIG. 12 illustrates a flow chart showing a PDCCH reception solution considering the environmental factors according to an exemplary embodiment of this specification.

FIG. 12 illustrates a flow chart showing a PDCCH reception solution considering the environmental factors according to an exemplary embodiment of this specification.

Referring to FIG. 12, the UE determines whether or not the network corresponds to a synchronous network (S101). Based on the determined result, in case the network corresponds to an asynchronous network, the UE receives a PDSCH by using an MMSE-IRC receiver (S103).

Based on the determined result, in case the network corresponds to a synchronous network, the UE determines whether or not a connected DRX mode has been configured (S105). Based on the determined result, in case the connected DRX mode is configured, the UE receives a PDCCH by using any one of an MMSE-IRC receiver and an MRC receiver (S107).

Based on the determined result, in case the connected DRX mode is not configured, the UE detects a CFI corresponding to the interfering cell (S109).

The UE determines whether or not the CFI of the serving cell (CFIs) is larger than the CFI of the interfering cell ($CFI_I$) (S111). Based on the determined result, if the CFI of the serving cell is smaller than the CFI of the interfering cell, the UE receives the PDCCH by using the E-LMMSE-IRC receiver (S113).

Based on the determined result, if the CFI of the serving cell is larger than the CFI of the interfering cell, the UE determines whether or not a load (Load' control) corresponding to the control channel of the interfering cell is larger than a predetermined threshold value (Th_load) (S115). Based on the determined result, if the load corresponding to the control channel of the interfering cell is smaller than the threshold value, the UE receives the PDCCH by using the MMSE-IRC (S103).

Based on the determined result, if the load corresponding to the control channel of the interfering cell is larger than the threshold value, the UE performs an effective channel estimation on the interfering cell (S117). In this case, in order to allow the UE to perform an effective channel estimation on the interfering cell, the UE may perform blind detection on the information related to the transmission mode (TM), the precoding matrix, and the allocated power of the interfering cell.

Based on the result of performing the channel estimation process on the interfering cell, the UE receives the PDCCH by using the E-LMMSE-IRC receiver (S113).

Figure 13:
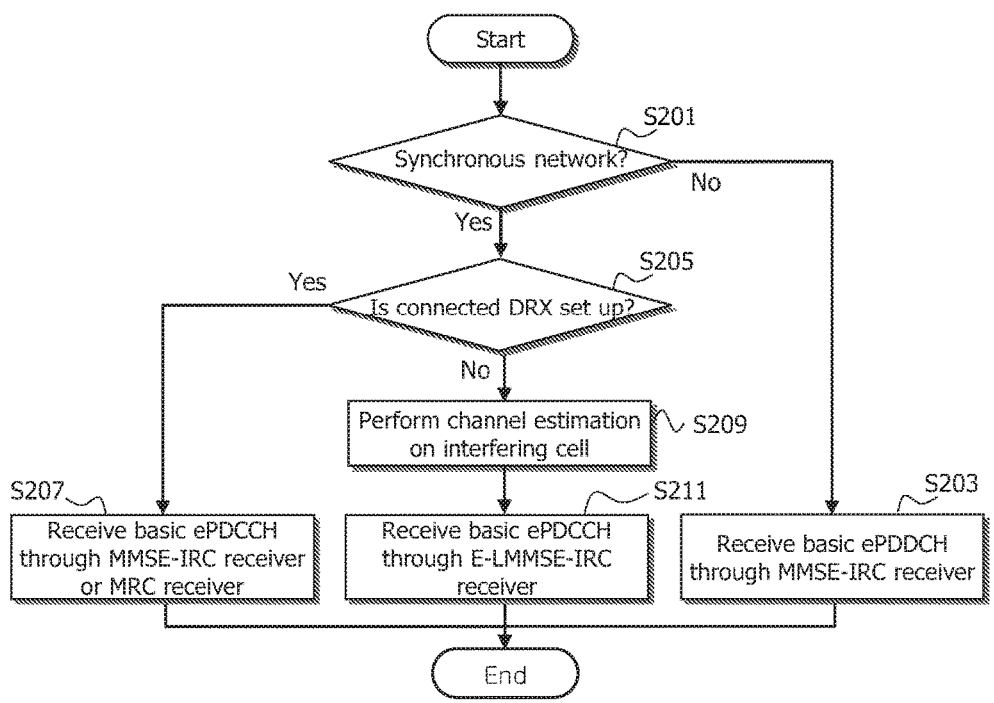
FIG. 13 illustrates a flow chart showing an ePDCCH reception solution considering the environmental factors according to an exemplary embodiment of this specification.

FIG. 13 illustrates a flow chart showing an ePDCCH reception solution considering the environmental factors according to an exemplary embodiment of this specification.

Referring to FIG. 13, the UE determines whether or not the network corresponds to a synchronous network (S201). Based on the determined result, in case the network corresponds to an asynchronous network, the UE receives an ePDCCH by using an MMSE-IRC receiver (S203).

Based on the determined result, in case the network corresponds to a synchronous network, the UE determines whether or not a connected DRX mode has been configured (S205). Based on the determined result, in case the connected DRX mode is configured, the UE receives the ePDCCH by using any one of an MMSE-IRC receiver and an MRC receiver (S207).

Based on the determined result, in case the connected DRX mode is not configured, the UE detects a CFI corresponding to the interfering cell (S209). In this case, in order to perform effective channel estimation for the interfering cell, the UE may perform blind detection on information related to a transmission mode (TM), a precoding matrix, an allocated power, RB allocation, and a DMRS port of the interfering cell.

Based on the result of performing channel estimation for the interfering cell, the UE receives the ePDCCH by using the E-LMMSE-IRC receiver (S211).

Figure 14:
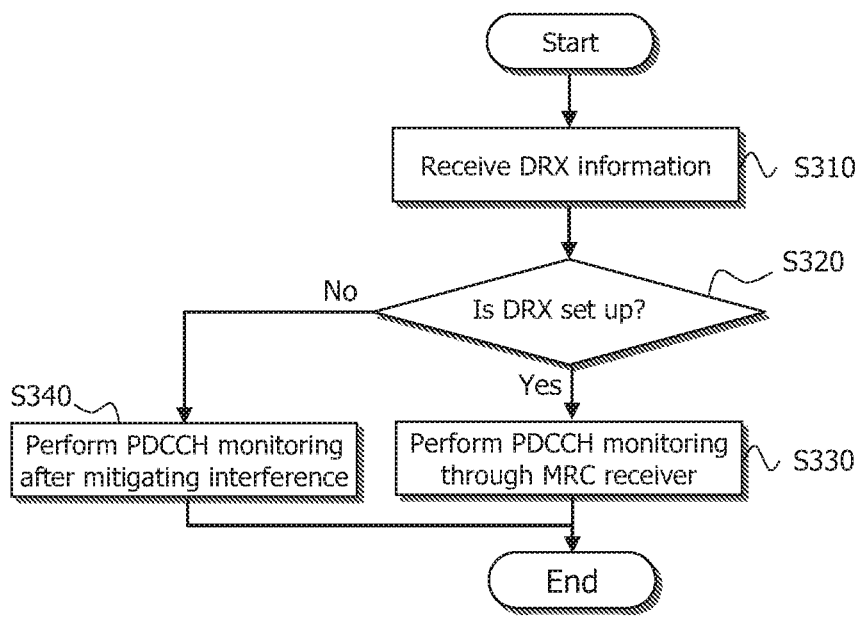
FIG. 14 illustrates a flow chart showing a method of receiving a downlink control channel that is being interfered by an adjacent (or neighboring) cell from a serving cell.

FIG. 14 illustrates a flow chart showing a method of receiving a downlink control channel that is being interfered by an adjacent (or neighboring) cell from a serving cell.

Referring to FIG. 14, the UE receives information on the DRX from the network (S310).

At this point, the information on the DRX (DRX cycle) includes information on a cycle period including a section (onDuration) during which a downlink control channel is monitored and a section (possible period of inactivity) during which the downlink control channel is not monitored. Herein, the downlink control channel may correspond to any one of PDCCH and ePDCCH.

The UE determines whether or not a DRX is being set up (S320). Based on the determined result, in case the DRX is set up and corresponds to the monitoring section, the UE monitors the downlink control channel that is being received from the serving cell (S330). At this point, the downlink control channel may be monitored in a state where the interference from a neighboring cell has not been mitigated. More specifically, the UE may monitor the downlink control channel through a Maximum Ratio Combining (MRC) receiver.

Based on the determined result, in case the DRX is not set up, the UE mitigates the interference caused in the downlink control channel by the neighboring cell and then monitors the interference-mitigated downlink control channel (S340). More specifically, the UE may mitigate the interference in the downlink control channel through any one of the E-LMMSE-IRC receiver and the MMSE-IRC receiver and may then monitor the processed downlink control signal. In case the CFI of the serving cell is larger than the CFI of the neighboring (or adjacent) cell, the UE may acquire a channel estimation value of the neighboring cell for the E-LMMSE-IRC receiver based on the information on the transmission mode (TM), the precoding matrix, and the allocated power. Additionally, in case a load corresponding to the control channel of the neighboring (or adjacent) cell is larger than a predetermined threshold value, the UE may mitigate the interference through the E-LMMSE-IRC receiver, and, in case the load corresponding to the control channel of the neighboring (or adjacent) cell is smaller than the predetermined threshold value, the UE may mitigate the interference through the MMSE-IRC receiver.

The above described exemplary embodiments of the present invention may be implemented through various means. For example, the exemplary embodiments of the present invention may be implemented by hardware, firmware, software, or a combination thereof. More detailed description will hereinafter be provided with reference to the accompanying drawings.

Figure 15:
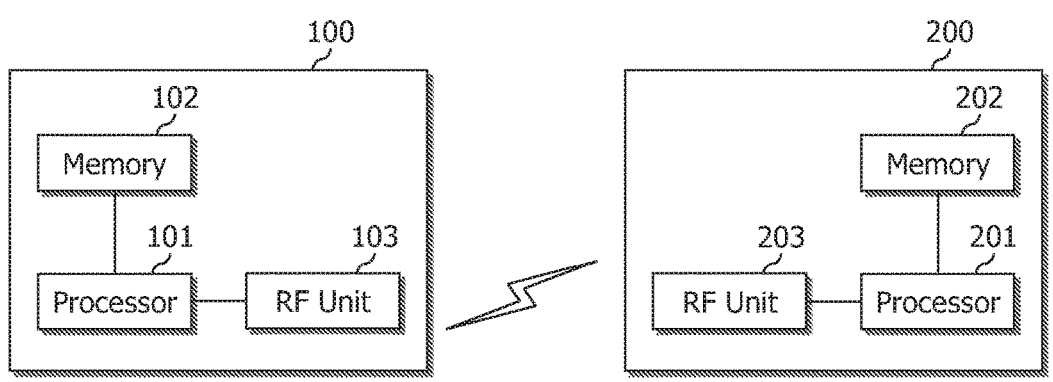
FIG. 15 is a block diagram showing a wireless communication system which implements the present invention.

FIG. 15 is a block diagram showing a wireless communication system which implements the present invention.

The base station 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The UE 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for receiving a downlink control channel being interfered by an adjacent cell from a serving cell, comprising:

receiving information related to discontinuous reception (DRX), wherein the information related to DRX includes information on a cycle period including a first duration where a downlink control channel is monitored and a second duration where the downlink control channel is not monitored; and monitoring the downlink control channel being received from the serving cell, based on the first duration, wherein the monitoring of the downlink control channel includes:

mitigating an interference caused by the adjacent cell in the downlink control channel, when the DRX is not set up; and monitoring the downlink control channel having its interference mitigated;

wherein, when a control format indicator (CFI) of the serving cell is larger than a CFI of the adjacent cell and when the interference in the downlink control channel is caused by a downlink data channel of the adjacent cell, the interference is mitigated based on information related to a transmission mode, a precoding matrix, and an allocated power of the downlink control channel.

2. The method of claim 1, wherein the downlink control channel is monitored through a Maximal Ratio Combination (MRC) receiver.

3. The method of claim 1, wherein the interference in the downlink control channel is mitigated by increasing a Signal-to-Interference-plus-Noise Ratio (SINR) through a plurality of antennas based on a Minimum Mean Square Error (MMSE).

4. The method of claim 3, wherein the interference in the downlink control channel is mitigated by further using a channel estimation result corresponding to the adjacent cell.

5. The method of claim 1,
wherein when a load corresponding to a control channel of the adjacent cell is larger than a predetermined threshold value, the interference in the downlink control channel is mitigated through an Enhanced-Linear Minimum Mean Square Error-Interference Rejection Combining (E-LMMSE-IRC) receiver, and
wherein when the load is smaller than the threshold value, the interference in the downlink control channel is mitigated through a Minimum Mean Square Error-Interference Rejection Combining (MMSE-IRC) receiver.

6. A user equipment (UE) for receiving a downlink control channel being interfered by an adjacent cell from a serving cell, comprising:
a radio frequency (RF) unit transmitting and receiving radio signals; and
a processor controlling the RF unit,
wherein the processor is configured to:
control the RF unit to receive information related to discontinuous reception (DRX), wherein the information related to DRX includes information on a cycle period including a first duration where a downlink control channel is monitored and a second duration where the downlink control channel is not monitored, and
control the RF unit to monitor the downlink control channel being received from the serving cell, based on the first duration,
wherein the monitoring, by the processor, of the downlink control channel includes:
mitigating an interference caused by the adjacent cell in the downlink control channel, when the DRX is not set up; and
monitoring the downlink control channel having its interference mitigated;
wherein, when a control format indicator (CFI) of the serving cell is larger than a CFI of the adjacent cell and when the interference in the downlink control channel is caused by a downlink data channel of the adjacent cell, the interference is mitigated based on information related to a transmission mode, a precoding matrix, and an allocated power of the downlink control channel.

7. The UE of claim 6, wherein the RF unit comprises:
a Maximal Ratio Combination (MRC) receiver,
wherein the processor monitors the downlink control channel through the MRC receiver.

8. The UE of claim 6, wherein the interference in the downlink control channel is mitigated by increasing a Signal-to-Interference-plus-Noise Ratio (SINR) through a plurality of antennas based on a Minimum Mean Square Error (MMSE).

9. The UE of claim 8, wherein the interference in the downlink control channel is mitigated by further using a channel estimation result corresponding to the adjacent cell.

10. The UE of claim 6,
wherein the RF unit comprises: an Enhanced-Linear Minimum Mean Square Error-Interference Rejection Combining (E-LMMSE-IRC) receiver and a Minimum Mean Square Error-Interference Rejection Combining (MMSE-IRC) receiver,
wherein, when a load corresponding to a control channel of the adjacent cell is larger than a predetermined threshold value, the processor mitigates the interference in the downlink control channel is through the E-LMMSE-IRC receiver, and
wherein when the load is smaller than the threshold value, the processor mitigates the interference in the downlink control channel is through the MMSE-IRC receiver.

* * * * *